US 6,405,289 B1

(12) United States Patent
Arimilli et al.

(10) Patent No.: US 6,405,289 B1
(45) Date of Patent: Jun. 11, 2002

(54) MULTIPROCESSOR SYSTEM IN WHICH A CACHE SERVING AS A HIGHEST POINT OF COHERENCY IS INDICATED BY A SNOOP RESPONSE

(75) Inventors: Ravi Kumar Arimilli, Austin; Leo James Clark, Georgetown; James Stephen Fields, Jr.; Guy Lynn Guthrie, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,196

(22) Filed: Nov. 9, 1999

(51) Int. Cl.$^7$ .............................................. G06F 12/00
(52) U.S. Cl. ..................... 711/145; 711/141; 711/146; 711/119; 711/122; 711/151; 711/144
(58) Field of Search ................................. 711/145, 144, 711/141, 146, 136, 135, 119, 120, 124, 159, 160, 121, 122, 151; 710/132

(56) References Cited

U.S. PATENT DOCUMENTS

| | | | | |
|---|---|---|---|---|
| 5,249,284 A | * | 9/1993 | Kass et al. .................... | 711/141 |
| 5,388,266 A | * | 2/1995 | Frey et al. .................... | 711/163 |
| 5,406,504 A | * | 4/1995 | Denisco et al. .............. | 702/117 |
| 5,737,759 A | * | 4/1998 | Merchant ..................... | 711/146 |
| 5,797,026 A | * | 8/1998 | Rhodehamel et al. ........... | 712/1 |
| 6,021,468 A | * | 2/2000 | Arimilli et al. ............... | 711/122 |
| 6,098,134 A | * | 8/2000 | Michels et al. ............... | 710/108 |
| 6,098,156 A | * | 8/2000 | Lenk .......................... | 711/146 |
| 6,101,582 A | * | 8/2000 | Arimilli et al. ............... | 711/141 |
| 6,125,429 A | * | 9/2000 | Goodwin et al. .............. | 711/143 |
| 6,138,218 A | * | 10/2000 | Arimilli et al. .............. | 711/146 |
| 6,141,733 A | * | 10/2000 | Arimilli et al. .............. | 711/141 |
| 6,145,059 A | * | 11/2000 | Arimilli et al. .............. | 711/143 |
| 6,192,451 B1 | * | 2/2001 | Arimilli et al. .............. | 711/141 |
| 6,304,939 B1 | * | 10/2001 | Liu et al. ..................... | 711/110 |

OTHER PUBLICATIONS

Jim Handy, "The Cache Memory Book", Academic Press, Inc., pp 48–61, 87–91, and 158–190, 1993.*

* cited by examiner

*Primary Examiner*—Hong Kim
(74) *Attorney, Agent, or Firm*—Casimer K. Salys; Bracewell & Patterson, L.L.P.

(57) ABSTRACT

A method of maintaining cache coherency, by designating one cache that owns a line as a highest point of coherency (HPC) for a particular memory block, and sending a snoop response from the cache indicating that it is currently the HPC for the memory block and can service a request. The designation may be performed in response to a particular coherency state assigned to the cache line, or based on the setting of a coherency token bit for the cache line. The processing units may be grouped into clusters, while the memory is distributed using memory arrays associated with respective clusters. One memory array is designated as the lowest point of coherency (LPC) for the memory block (i.e., a fixed assignment) while the cache designated as the HPC is dynamic (i.e., changes as different caches gain ownership of the line). An acknowledgement snoop response is sent from the LPC memory array, and a combined response is returned to the requesting device which gives priority to the HPC snoop response over the LPC snoop response.

14 Claims, 5 Drawing Sheets

MULTIPROCESSOR SYSTEM IN WHICH A CACHE SERVING AS A HIGHEST POINT OF COHERENCY IS INDICATED BY A SNOOP RESPONSE

BACKGROUND OF THE INVENTION

1. Field of the Invention

The present invention generally relates to computer systems, specifically to a method of maintaining cache coherency in a multiprocessor computer system, and more particularly to an improved cache coherency protocol which allows the point of coherency (or coherency control) to dynamically float so as to more efficiently handle cache operations in systems with complicated interconnection topologies.

2. Description of Related Art

The basic structure of a conventional multiprocessor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multiprocessor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop"(monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write to the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the cache coherency protocol. This improvement referred to as "intervention," allows a cache having control over a memory block to provide the data in that block directly to another cache requesting the value (for a read-type operation), in other words, bypassing the need to write the data to system memory and then have the requesting processor read it back again from memory. Intervention can generally be performed only by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. The tagged ("T") state is used to identify a cache block which is inconsistent with system memory (i.e., modified) and is further responsible for writing the correct (current) value to memory upon deallocation (or to pass on the tag to another cache block during intervention). The T state can be used to share a modified value, by marking one of the sharing blocks as (temporarily) responsible for maintaining a valid copy of the value. The recently read ("R") state can be used to allow intervention when the value is unmodified but shared among many caches, so as to conveniently mark a single one of the sharing caches as being responsible for intervention. The hover ("H") state allows a cache line to maintain an address in the directory even though the corresponding value in the cache entry array is an invalid copy, so that it can snoop the correct value for its processing unit if the value happens to be broadcast as part of an intervention between the caches of two other processing units.

In simpler systems, such as that shown in FIG. 1, a system controller 32 acts as a central receiver to coordinate coherency responses (controller 32 is often integrated into main memory 16). When a device issues a read, write or deallocation request, and various other devices in the system snoop and respond to the request (as discussed above), their responses are generally collected by controller 32 which then formulates a combined response to return to the requesting device (master). The combined response is based on known response priority logic.

Controller 32 is also typically responsible for protecting the target cache line until non-retry responses are received from all of the snoopers. For example, a bus master (processing unit or I/O device) may issue a read-with-intent-to-modify (RWITM) request, and one of the snoopers may provide a response indicating that its cache currently holds the requested value and can intervene it, but other snoopers may issue retry responses. In such a case, controller 32 ensures that no other master accesses the requested memory block until completion of the first operation.

As the number of processing units in multiprocessor systems has increased, the interconnection topologies for the processing units, cache and system memory have become quite complicated, and can lead to inefficiencies in the handling of coherency operations. Multiprocessor systems with large numbers of processors (e.g., 32) are often grouped into processing clusters, with two or more processor sharing lower level (L2) caches, and the processing clusters being coupled to one another using multiple buses, switches and cross-bars. In such systems, all snooping devices may not receive a master's request at the same time due to different delays through the interconnection topology. The intricate nature of these connections makes it more difficult to collect all responses in a timely manner, and form a proper combined response, particularly when a device in one processing cluster contains a value that is requested by a device in a different processing cluster. The difficulty is compounded if two masters simultaneously issue conflicting access requests to different sectors of the same cache line. The result is an overall reduction in system performance.

Providing a central point of coherency is additionally much more problematic for systems with distributed memory, such as non-uniform memory access (NUMA) systems wherein RAM is divided among two or more memory arrays allocated to respective processing units. A NUMA memory architecture is common with the aforementioned systems having a large number of processors grouped into clusters. With such systems, a single controller cannot be located in such a manner as to be able to efficiently monitor all of the snoop responses and control all of the memory devices.

In light of the foregoing, it would be desirable to provide a method of serializing cache transactions which did not require a central point of coherency, such as that afforded by a system controller. It would be further advantageous if the method could easily protect a requested cache line until completion of an initial cache operation without adversely affecting system performance.

SUMMARY OF THE INVENTION

It is therefore one object of the present invention to provide an improved method of maintaining cache coherency in a multiprocessor system.

It is another object of the present invention to provide such a method which does not require a central point of coherency, i.e., a single system controller which formulates a combined response.

It is yet another object of the present invention to provide an improved method of handling cache operations in a multiprocessor system having a plurality of processor clusters and a distributed system memory.

The foregoing objects are achieved in a method of maintaining cache coherency in a multiprocessor computer system, comprising the steps of designating a single cache as a highest point of coherency (HPC) for a particular memory block (wherein the cache contains a valid value corresponding to the memory block), issuing a request for the value from a master device of the computer system, and sending a snoop response from the cache indicating that it is currently the HPC for the memory block and can service the request. The designation may be performed in response to a particular coherency state assigned to the cache line which uniquely identifies the cache line with respect to the memory block or, alternatively, based on the setting of a coherency token bit for the cache line. In an illustrative embodiment, the processing units are grouped into clusters which are coupled using cross-bar switches, and the memory is distributed using memory arrays associated with respective clusters. One of the memory arrays, which contains the memory block, is further designated as a lowest point of coherency (LPC) for the memory block. This memory array can first protect the memory block from any conflicting operation, and the cache thereafter will protect the memory block until completion of the requested transaction. An acknowledgement snoop response is sent from the LPC memory array and the HPC cache, and a combined response is returned to the master device which gives priority to the snoop response from the HPC cache over the acknowledgement snoop response from the memory array, i.e., the HPC controls the coherency response. The combined response may include an indication of a coherency state to be assigned to a cache line of the master device upon receiving the value.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
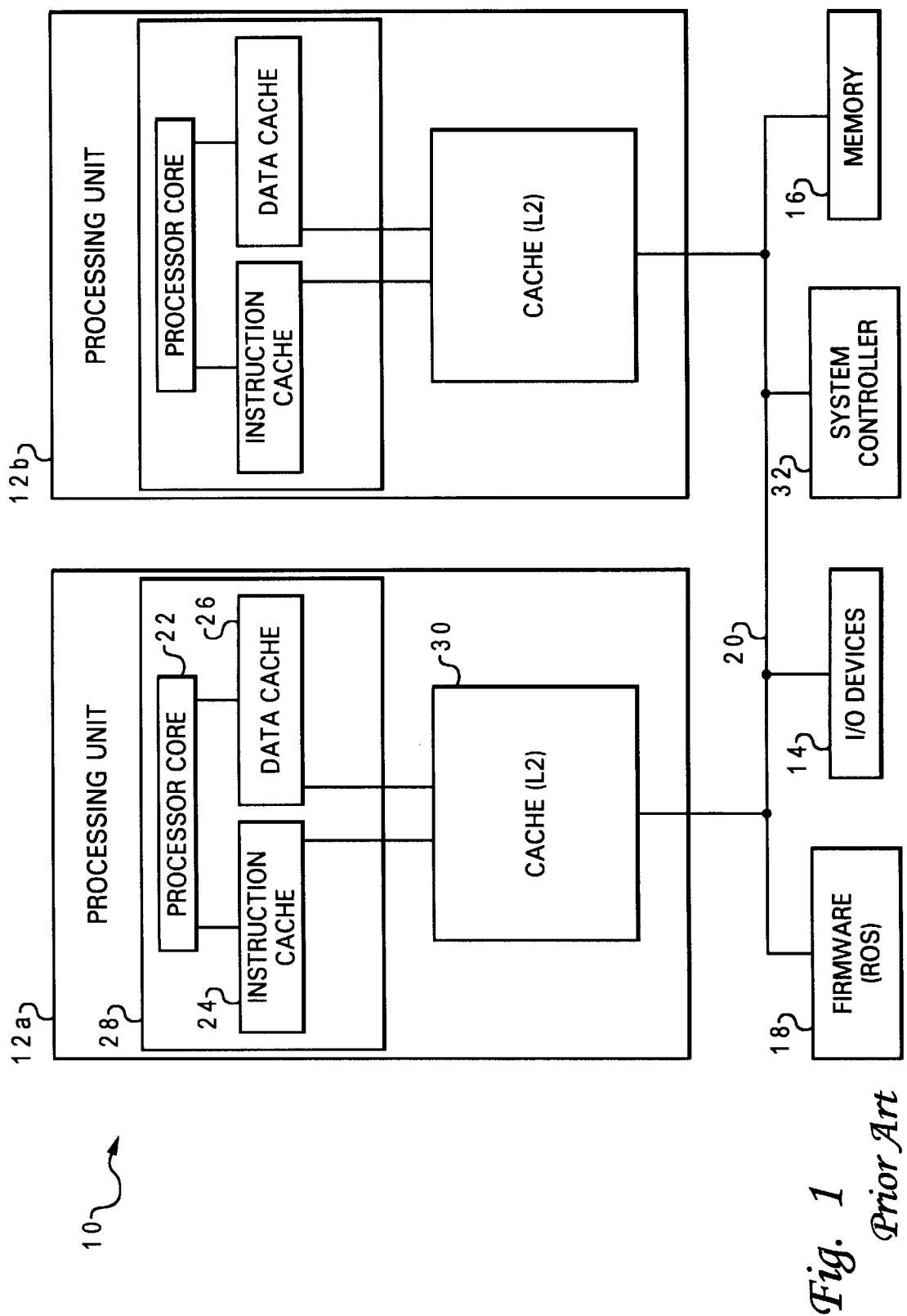
FIG. 1 is a block diagram of a prior art multiprocessor computer system.
Figure 3:
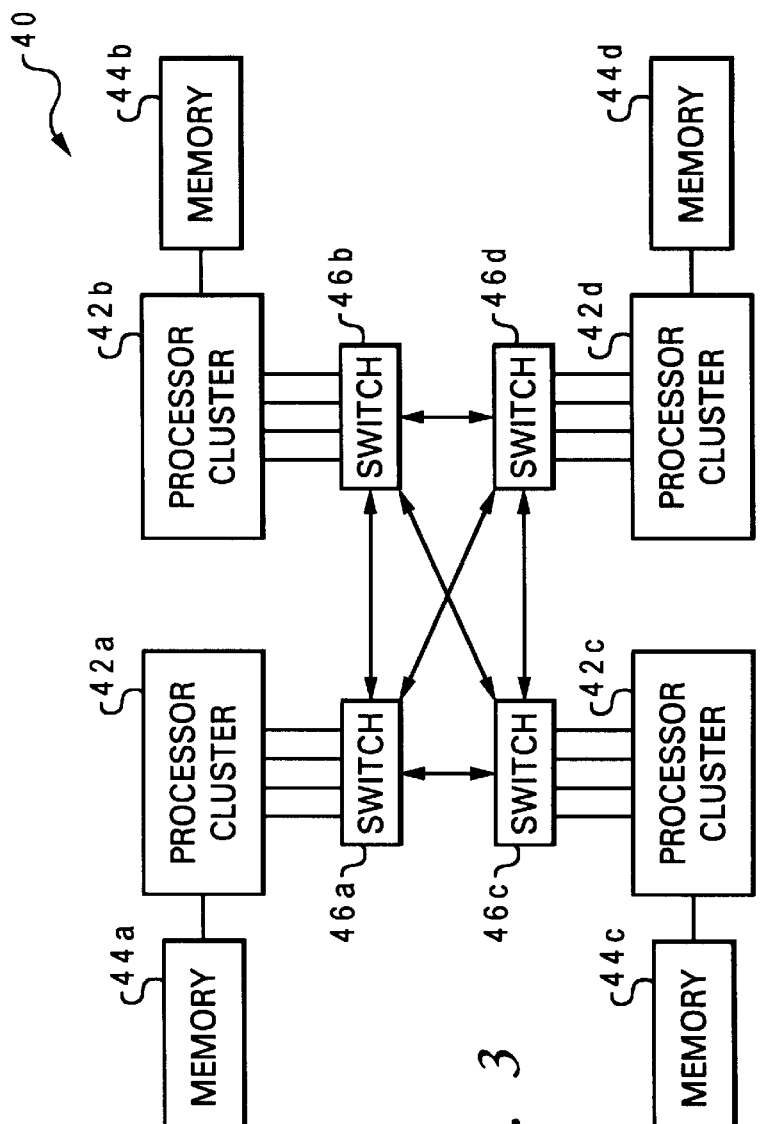
FIG. 3 is a block diagram of one embodiment of a multiprocessor computer system constructed in accordance with the present invention, having distributed system memory and multiple processor clusters coupled by switches and cross-bars.
Figure 2:
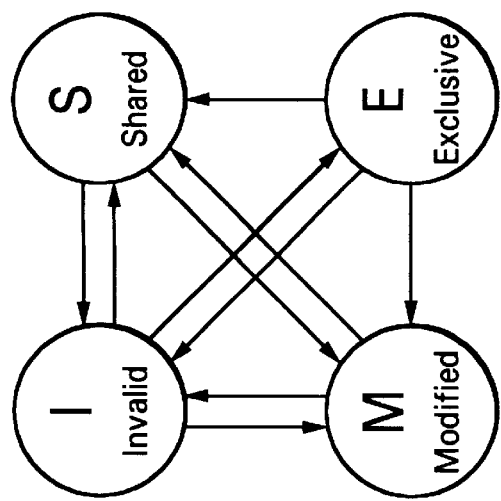
FIG. 2 is a state diagram depicting a prior art cache coherency protocol (MESI)

With reference now to the FIG., and in particular with reference to FIG. 3, there is depicted one embodiment 40 of a multiprocessor computer system constructed in accordance with the present invention. Computer system 40 comprises a plurality of processor clusters 42*a*, 42*b*, 42*c* and 42*d*, and a distributed memory including mutually exclusive memory arrays 44*a*, 44*b*, 44*c* and 44*d*. Each memory array is associated with a respective processor cluster. The processor clusters are coupled using four switches 46*a*, 46*b*, 46*c* and 46*d*. Computer system 40 further includes a plurality of input/output (I/O) devices which are not shown for simplicity, that may be accessed via an interconnect bus connected to the switches. The present invention is directed to a method of handling cache operations in a memory-coherent, multiprocessor system such as the system of FIG. 4, but the present invention could be applied to computer systems that have additional hardware components not shown in FIG. 4, or having a different interconnection architecture (or both), so those skilled in the art will appreciate that the present invention is not limited to the generalized system shown in that figure.

Figure 4:
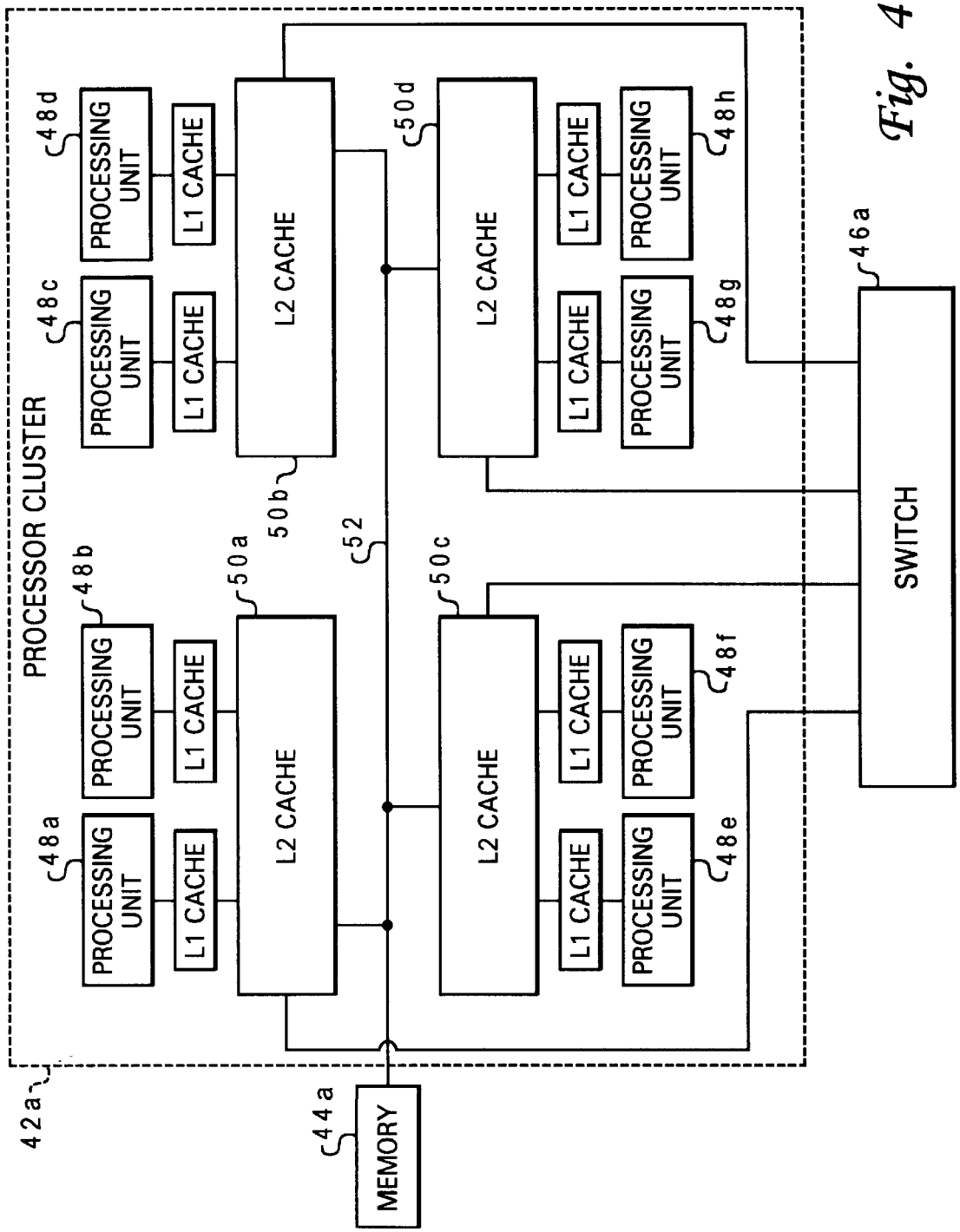
FIG. 4 is a block diagram of one of the processor clusters of FIG. 3.

An exemplary design for the processor clusters is further shown in FIG. 4. In the illustrative embodiment, computer system 40 is a 32-processor system, with eight processing units being provided in a given processor cluster. Processor cluster 42*a* thus has eight processing units 48*a*, 48*b*, 48*c*, 48*d*, 48*e*, 48*f*, 48*g* and 48*h*. The processing units are paired such that a single lower level (L2) cache is provided for a given pair. Processing units 48*a* and 48*b* use L2 cache 50*a*; processing units 48*c* and 48*d* use L2 cache 50*b*; processing units 48*e* and 48*f* use L2 cache 50*c*; and processing units 48*g* and 48*h* use L2 cache 50*d*. Inter-cache connections are provided by a local bus 52, and each of the L2 caches is also coupled to switch 46*a*. Local bus 52 may be used to access the associated memory array (44*a*). A similar construction is provided for processor clusters 42*b*, 42*c* and 42*d*. Hereinafter, a given processor is identified using a subscript notation $P_{x,y}$, where the "x" index indicates the particular processor cluster (0–3), and the "y" index indicates the particular processing unit within the cluster (0–7). So, for example, processing unit 48*f* may be referred to as processor $P_{0,5}$.

As suggested in the Background section, snooping devices of computer system 40 may not all receive a given request at the same time, due to the different delays through different lines provided by the interconnection topology. In order to avoid latencies that might otherwise arise in such a system if a central (permanent) point of coherency were used, the present invention allows the point of coherency (serialization) to float or move among the various snooping devices. A floating point of coherency may be realized using different methods, as described further herein.

One preferred method is to assign a "highest" point of coherency to any cache line which can be uniquely identified as having a valid copy of the requested value. Thus, a cache line in the modified (M) or exclusive (E) states may be designated as the highest point of coherency (HPC) since such a cache line is held to the exclusion of all other caches of other processing units. Similarly, a cache line in the tagged (T) state may be designated the HPC, even though other caches share the value, since the T state may be used to uniquely identify a single cache line as being responsible for writing the value to memory upon deallocation. The particular memory array (44*a* –44*d*) which contains the target memory block is designated as the "lowest" point of coherency (LPC). Only one LPC exists for a particular cache line, and its assignment is fixed to a particular memory array.

According to this implementation, a cache line that is the HPC controls the coherency response (i.e., takes priority). Consider, for example, the situation wherein two processing units in different clusters (e.g., processors $P_{0,0}$ and $P_{1,0}$) simultaneously issue read-with-intent-to-modify (RWITM) requests for the same memory block (these operations could be asynchronous requests directed to two different sectors of the same block). A cache in a third processor cluster, which contains a current copy of the requested value, may not see the two requests in the same order as seen by the particular memory array which contains the target block. The cache containing the value (the HPC) will issue an acknowledgement signal (HPC_Ack) to the master that it first detects (say, $P_{0,0}$) to indicate that it can service the request, and issue a retry signal (HPC_Retry) to the master that is later detected ($P_{1,0}$). If the memory array (the LPC) sees the requests in the opposite order, it will issue an acknowledgement (LPC_Ack) to $P_{1,0}$, and issue a retry (LPC_Retry) to $P_{0,0}$. The combined response logic will receive the HPC_Ack signal and know to give priority to that signal over the LPC_Ack response. Therefore, processor $P_{0,0}$ will proceed with its transaction first.

The combined response (a multi-bit signal) will indicate the state that should be assigned to the cache line for the master. The combined response may therefore be in the format of "HPC_go_X" or "LPC_go_X" where "X" is the state to be assigned, e.g., "go_S" for shared, "go_M" for modified, or "go_T" for tagged, etc. The combined response is formulated and sent by a controller at the master node (cluster), so it is seen first by the master and then by the snoopers. The combined response of "LPC_go_X" will be sent only if there are no retry snoop responses (in addition to no HPC response), since a retrying snooper may be the HPC (and LPC data may be stale). In other words, if no HPC snoop response is received but a retry snoop response is received, then the combined response will be a retry.

An HPC may or may not exist at any given time for a particular cache line. In the absence of any HPC response, the LPC memory array will serialize the transactions. Any memory array which does not own the target memory block simply issues a null response. After all transactions are completed, the new owner of the cache block becomes the new point of coherency for that block.

Figure 5A:
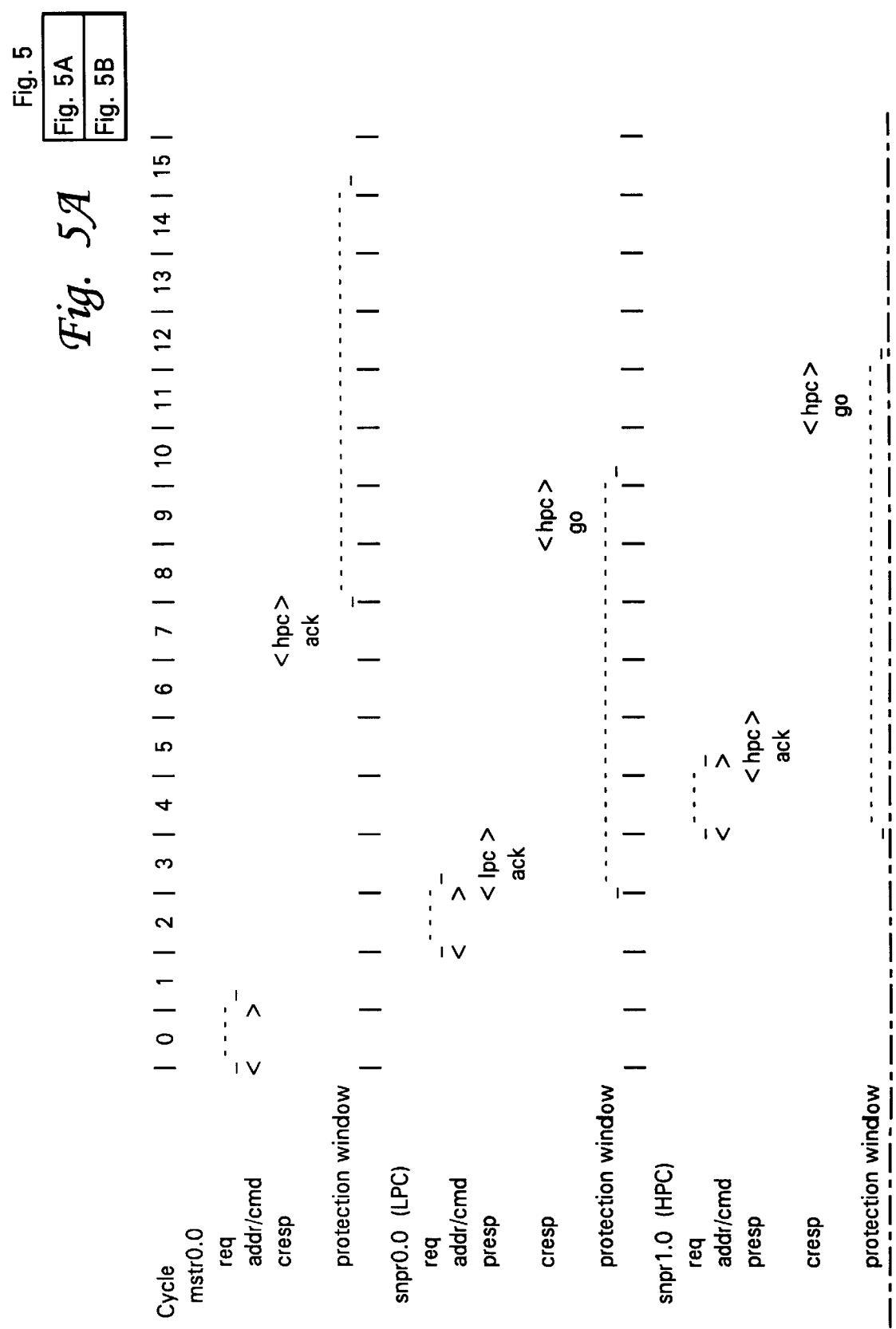
FIG. 5 is a timing diagram illustrating one implementation of the present invention wherein a snooping device (temporarily) becomes the point of coherency for a particular snooped transaction.
Figure 5B:
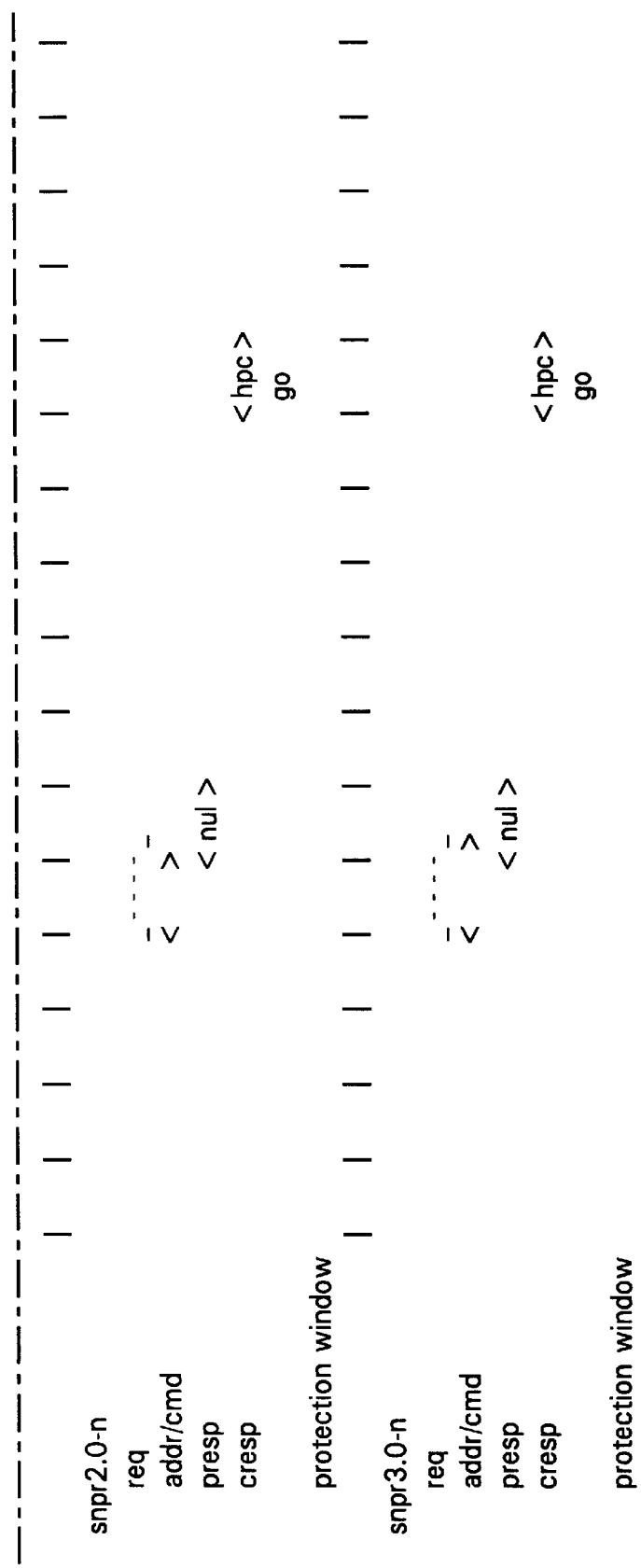

The use of the HPC/LPC protocol may be further understood with reference to the timing diagram of FIG. 5. This exemplary diagram depicts a request from a master (mstr$_{0,0}$), responses from snoopers (snpr$_{0,0}$, snpr$_{1,0}$, etc.), a combined response (cresp), and protection exchanges between the master, the HPC and the LPC. During cycle 0, the master issues the request. During cycle 2, the snooper (memory) at node 0 (which happens to correspond to the LPC) sees the request. During cycle 3, the LPC issues an LPC_Ack response, and starts protecting the line. During cycle 4, the remaining snoopers see the request. During cycle 5, the snooper at node 1 (which happens to correspond to the HPC) issues an HPC_Ack response, and also starts protecting the line. All of the snoop responses are collected and, during cycle 7, the master broadcasts a combined HPC response. During cycle 9, the LPC sees the combined HPC response, and so stops protecting the line (since the logic assumes that the HPC will protect the line and service the request). During cycle 11, the remaining snoopers (including the HPC) see the combined HPC response and take whatever action is appropriate (e.g., the HPC servicing the request, and the other nodes deallocating the corresponding line in their caches if the response was "HPC_go_M").

During cycle 15, after the master has received the requested value and is finished with the operation, it can stop protecting the line, making it available to another requesting master. It may be noted that, while waiting for the snoop responses, the master will not necessarily protect the target memory block (unlike the prior art). Some snooper, however (either the HPC or LPC), will be protecting the line during the exchange.

In an alternative implementation, each cache line is provided with an extra bit that is used as a point of coherency token. If the bit is set (i.e., "high" or "on"), then that cache line is designated the HPC, regardless of its coherency state. In this manner, a cache line may become the HPC even if it is not in the M or T state. This variation is particularly useful when the T state may not be implemented as a fully unique state, such as in a hierarchical implementation wherein the T state is used locally within a processor cluster as opposed to a global indication for caches in all processor clusters. The HPC bit may be set by the operating system, or via a special instruction set architecture (such as an extension of the PowerPC™ instruction set architecture) which provides instructions (e.g., load and store instructions) having a special flag to indicate whether the bit should be set.

For multi-level cache hierarchies, any cache level may be designated an HPC. Although FIG. 4 illustrates only a two-cache hierarchy, it is understood that the present invention could be applied as well to, e.g., an L3 cache.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the illustrative embodiment of FIG. 3 uses cross-bar type switches, but the HPC/LPC protocol could also be applied to a ring topology. It is therefore contemplated that such modifications can be made without departing from the spirit or scope of the present invention as defined in the appended claims.

What is claimed is:

1. A method of maintaining cache coherency in a multi-processor computer system including a plurality of memory arrays and a plurality of processing units that each have at least one cache, said method comprising:
    designating a memory array that contains a memory block as a lowest point of coherency for the memory block;
    designating a single cache containing a valid value corresponding to the memory block as a highest point of coherency for the memory block;
    issuing a request for the value from a master device of the computer system;
    in response to the request:
        the memory array designated as the lowest point of coherency first protecting the memory block from any conflicting operation; and
        the cache designated as the highest point of coherency sending a snoop response indicating that the cache is currently the highest point of coherency for the memoryblock and can service the request and thereafter protecting the memory block from any conflicting operation until completion of a transaction associated with the request.

2. The method of claim 1 wherein designating a single cache includes assigning to a cache line in the cache a coherency state which uniquely identifies the cache line with respect to the memory block.

3. The method of claim 1 wherein designating a single cache includes the step of setting a coherency token bit for a cache line in the cache.

4. The method of claim 1 wherein each processing unit has a multi-level cache hierarchy, and designating a single cache comprises designating a second level cache as the highest point of coherency for the memory block.

5. The method of claim 1 wherein said processing units are grouped into clusters, and further comprising the step of coupling the clusters using a plurality of cross-bar switche.

6. The method of claim 1 further comprising:
    sending an acknowledgement snoop response from the memory array that is the lowest point of coherency, in response to said issuing step; and
    returning a combined response to the master device, in response to said sending steps, wherein the combined response gives priority to the snoop response from the cache over the acknowledgement snoop response from the memory array.

7. The method of claim 6 wherein said returning step returns the combined response with an indication of a coherency state to be assigned to a cache line of the master device upon receiving the value.

8. A computer system comprising:
    distributed system memory including a plurality of memory arrays;
    a plurality of processing units each having a cache;
    an interconnect coupled to said system memory and said processing units; and
    cache coherency means for (1) designating a memory array containing a memory block as a lowest point of coherency for the memory block, (2) designating a single one of said caches containing a valid value corresponding to the memory block as a highest point of coherency for the memory block, and (3) sending a snoop response indicating that said cache is currently the highest point of coherency for the memory block and can service a request for the value issued from a master device;
    wherein said memory array designated as the lowest point of coherency first protects the memory block from any conflicting operation and said cache designated as the highest point of coherency thereafter protects the memory block from any conflicting operation until completion of a transaction associated with the request.

9. The computer system of claim 8 wherein said cache coherency means designates said cache as the highest point of coherency based on a coherency state assigned to a cache line of said cache which uniquely identifies said cache line with respect to the memory block.

10. The computer system of claim 8 wherein said cache coherency means designates said cache as the highest point of coherency based on a setting of a coherency token bit for a cache line in said cache.

11. The computer system of claim 8 wherein:
   each processing unit has a multi-level cache hierarchy; and
   said cache is a second level cache.

12. The computer system of claim 8 wherein said processing units are grouped into clusters and said interconnect comprises a plurality of cross-bar switches.

13. The computer system of claim 8 wherein said cache coherency means further sends an acknowledgement snoop response from said memory array designated as the lowest point of coherency, and returns a combined response to said master device giving priority to the snoop response from said cache over the acknowledgement snoop response from said memory array.

14. The computer system of claim 13 wherein said cache coherency means returns the combined response with an indication of a coherency state to be assigned to a cache line of said master device upon receiving the value.

* * * * *